United States Patent
Carroll, III et al.

(10) Patent No.: US 7,360,822 B2
(45) Date of Patent: Apr. 22, 2008

(54) MODULAR ENERGY ABSORBER AND METHOD FOR CONFIGURING SAME

(75) Inventors: Phillip Patrick Carroll, III, Bloomfield Hills, MI (US); Joel Matthew Cormier, Ferndale, MI (US); Paul Gerard Grenier, Lake Orion, MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 0 days.

(21) Appl. No.: 10/760,760

(22) Filed: Jan. 20, 2004

(65) Prior Publication Data

US 2004/0178662 A1    Sep. 16, 2004
US 2006/0066134 A2    Mar. 30, 2006

Related U.S. Application Data

(63) Continuation-in-part of application No. 10/004,739, filed on Dec. 4, 2001, now Pat. No. 6,752,450, which is a continuation-in-part of application No. 09/884,813, filed on Jun. 19, 2001, now Pat. No. 6,682,128, which is a continuation-in-part of application No. 09/499,205, filed on Feb. 7, 2000, now Pat. No. 6,247,745, which is a continuation of application No. 09/328,196, filed on Jun. 8, 1999, now Pat. No. 6,199,942, which is a continuation-in-part of application No. 09/018,666, filed on Feb. 4, 1998, now Pat. No. 6,017,084, application No. 10/760,760, which is a continuation-in-part of application No. 09/617,691, filed on Jul. 17, 2000, now Pat. No. 6,679,967, which is a continuation-in-part of application No. 09/328,196, filed on Jun. 8, 1999, now Pat. No. 6,199,942, which is a continuation-in-part of application No. 09/018,666, filed on Feb. 4, 1998, now Pat. No. 6,017,084.

(51) Int. Cl.
*B60R 21/04* (2006.01)

(52) U.S. Cl. .................. 296/187.03; 293/133; 280/751; 188/371

(58) Field of Classification Search ........... 296/187.03, 296/187.04, 187.05, 187.09, 187.11, 187.12; 293/132, 133, 102, 109, 110; 280/751, 748; 188/371, 377
See application file for complete search history.

(56) References Cited

U.S. PATENT DOCUMENTS 2,275,575 A    3/1942    Vrooman
(Continued)

FOREIGN PATENT DOCUMENTS

DE    199 47 245 A1    4/2000
(Continued)

OTHER PUBLICATIONS

Supplementary European Search Report, Application No. EP 00 94 1232.1, Mar. 17, 2003.
(Continued)

*Primary Examiner*—Joseph D. Pape
(74) *Attorney, Agent, or Firm*—Brooks Kushman P.C.

(57) ABSTRACT

A modular energy absorber 10 that is tunable. It comprises one or more energy absorbing modules 12. The energy absorbing modules have means for coordinating energy absorbing units 16 of the one or more modules. The means 14 for coordinating position and support the units in relation to each other before, during and after relative motion between an incident object and the energy absorber. A crushable member is provided that has an upper perimeter, a lower perimeter and an intermediate section extending therebetween. It also includes a number (m) of breaches defined therein before impact.

A method for configuring the modular energy absorber is also disclosed.

11 Claims, 7 Drawing Sheets

U.S. PATENT DOCUMENTS

| | | |
|---|---|---|
| 2,346,161 A | 4/1944 | Grant |
| 2,349,907 A | 5/1944 | Kos et al. |
| 3,018,015 A | 1/1962 | Agriss et al. |
| 3,088,539 A | 5/1963 | Mathues et al. |
| 3,195,686 A | 7/1965 | Johnson |
| 3,231,454 A | 1/1966 | Williams |
| 3,575,781 A | 4/1971 | Pezely |
| 3,684,235 A | 8/1972 | Schupbach |
| 3,782,767 A | 1/1974 | Moore |
| 3,837,991 A | 9/1974 | Evans |
| 3,853,221 A | 12/1974 | Boyd |
| 3,871,636 A | 3/1975 | Boyle |
| 3,926,463 A | 12/1975 | Landwehr et al. |
| 3,933,387 A | 1/1976 | Salloum et al. |
| 3,997,207 A | 12/1976 | Norlin |
| 4,022,505 A | 5/1977 | Saczawa, Jr. |
| 4,029,350 A | 6/1977 | Goupy et al. |
| 4,154,489 A | 5/1979 | Goupy et al. |
| 4,190,276 A | 2/1980 | Hirano et al. |
| 4,321,989 A | 3/1982 | Meinzer |
| 4,352,484 A | 10/1982 | Gertz et al. |
| 4,413,856 A | 11/1983 | McMahan et al. |
| 4,460,205 A | 7/1984 | Glance |
| 4,578,296 A | 3/1986 | Miyazaki et al. |
| 4,601,367 A | 7/1986 | Bongers |
| 4,631,221 A | 12/1986 | Disselbeck et al. |
| 4,635,981 A | 1/1987 | Friton |
| 4,666,130 A | 5/1987 | Denman et al. |
| 4,670,995 A | 6/1987 | Huang |
| 4,720,261 A | 1/1988 | Fishwick et al. |
| 4,838,606 A | 6/1989 | Furubayashi et al. |
| 4,844,213 A | 7/1989 | Travis |
| 4,856,833 A | 8/1989 | Beekman |
| 4,858,606 A | 8/1989 | Hamlin |
| 4,890,877 A | 1/1990 | Ashtiani-Zarandi et al. |
| 4,904,008 A | 2/1990 | Glance |
| 4,909,661 A | 3/1990 | Ivey |
| 4,925,224 A | 5/1990 | Smiszek |
| 4,941,701 A | 7/1990 | Loren |
| 4,951,986 A | 8/1990 | Hanafusa et al. |
| 4,969,680 A | 11/1990 | Shimoda |
| 5,030,501 A | 7/1991 | Colvin et al. |
| 5,033,593 A | 7/1991 | Kazuhito |
| 5,141,279 A | 8/1992 | Weller |
| 5,150,935 A | 9/1992 | Glance et al. |
| 5,165,990 A | 11/1992 | Nakano |
| 5,192,157 A | 3/1993 | Laturner |
| 5,198,175 A | 3/1993 | Kato et al. |
| 5,225,213 A | 7/1993 | Brown et al. |
| 5,244,745 A | 9/1993 | Seksaria et al. |
| 5,282,288 A | 2/1994 | Henson |
| 5,306,066 A | 4/1994 | Saathoff |
| 5,364,682 A | 11/1994 | Tanaka et al. |
| 5,382,051 A | 1/1995 | Glance |
| 5,399,406 A | 3/1995 | Matsuo et al. |
| 5,425,561 A | 6/1995 | Morgan |
| 5,431,463 A | 7/1995 | Chou |
| 5,435,619 A | 7/1995 | Nakae et al. |
| 5,493,791 A | 2/1996 | Kramer |
| 5,500,037 A | 3/1996 | Alhamad |
| 5,518,802 A | 5/1996 | Colvin et al. |
| 5,549,327 A | 8/1996 | Rusche et al. |
| 5,573,272 A | 11/1996 | Teshima |
| 5,595,003 A | 1/1997 | Snow |
| 5,636,866 A | 6/1997 | Suzuki et al. |
| 5,660,426 A | 8/1997 | Sugimori et al. |
| 5,700,545 A | 12/1997 | Audi et al. |
| 5,727,826 A | 3/1998 | Frank et al. |
| 5,731,062 A | 3/1998 | Kim et al. |
| 5,732,801 A | 3/1998 | Gertz |
| 5,746,419 A | 5/1998 | McFadden et al. |
| 5,759,594 A | 6/1998 | Masui et al. |
| 5,762,392 A | 6/1998 | Suga |
| 5,769,003 A | 6/1998 | Rose et al. |
| 5,799,991 A | 9/1998 | Glance |
| 5,836,641 A | 11/1998 | Sugamoto et al. |
| 5,932,316 A | 8/1999 | Cree et al. |
| 5,950,835 A | 9/1999 | Moser et al. |
| 5,958,326 A | 9/1999 | Caferro |
| 5,972,477 A | 10/1999 | Kim et al. |
| 6,000,738 A | 12/1999 | Stewart et al. |
| 6,012,764 A | 1/2000 | Seksaria et al. |
| 6,017,084 A | 1/2000 | Carroll, III et al. |
| 6,085,878 A | 7/2000 | Araki et al. |
| 6,099,055 A | 8/2000 | Hirota et al. |
| 6,199,942 B1 | 3/2001 | Carroll, III et al. |
| 6,247,745 B1 | 6/2001 | Carroll, III et al. |
| 6,443,513 B1 | 9/2002 | Glance |
| 6,550,850 B2 | 4/2003 | Laborie et al. |
| 6,679,544 B1 * | 1/2004 | Hubbert et al. ........ 296/187.05 |

FOREIGN PATENT DOCUMENTS

| | | |
|---|---|---|
| EP | 56131849 | 10/1981 |
| EP | 0 863 056 A1 | 9/1998 |
| WO | WO 00/01525 | 1/2000 |
| WO | WO 00/31434 | 6/2000 |

OTHER PUBLICATIONS

International Search Report, Application No. PCT/US02/37005, Mar. 31, 2003.

PCT International Search Report for PCT/US02/19527, filed Jun. 19, 2002, mailed Mar. 3, 2003.

PCT International Search Report for PCT/US01/11905, filed Apr. 12, 2001, mailed Aug. 8, 2001.

PCT International Search Report for PCT/US99/14847.

PCT International Search Report for PCT/US00/15509, mailed Aug. 21, 2000.

* cited by examiner

MODULAR ENERGY ABSORBER AND METHOD FOR CONFIGURING SAME

CROSS-REFERENCE TO RELATED APPLICATIONS

This application is a continuation-in-part of U.S. application Ser. No. 10/004,739 filed Dec. 4, 2001 (now U.S. Pat. No. 6,752,450) which is a continuation-in-part of U.S. application Ser. No. 09/884,813 filed Jun. 19, 2001 (now U.S. Pat. No. 6,682,128) which is a continuation-in-part of U.S. application Ser. No. 09/499,205 filed Feb. 7, 2000 (now U.S. Pat. No. 6,247,745), which is a continuation of U.S. application Ser. No. 09/328,196 filed Jun. 8, 1999 (now U.S. Pat. No. 6,199,942), which is a continuation-in-part of U.S. application Ser. No. 09/018,666 filed Feb. 4, 1998 (now U.S. Pat. No. 6,017,084), the disclosures of which applications are being incorporated by reference herein. This application is also a continuation-in-part of U.S. application Ser. No. 09/617,691 filed Jul. 17, 2000 (now U.S. Pat. No. 6,679,967) which is a continuation-in-part of U.S. application Ser. No. 09/328,196 filed Jun. 8, 1999 (now U.S. Pat. No. 6,199,942), which is a continuation-in-part of U.S. application Ser. No. 09/018,666 filed Feb. 4, 1998 (now U.S. Pat. No. 6,017,084), the disclosures of which applications are being incorporated by reference herein.

BACKGROUND OF THE INVENTION

1. Field of the Invention

This invention generally relates to occupant safety during a collision, and more specifically to an energy absorber that absorbs energy imparted by an incident object that impacts the absorber, and a method for configuring the absorber.

2. Background Art

There have been proposed various ways to protect the occupant or rider of an automobile when the occupant impacts the A and B pillars, headliner. or any hard structure during an impact. Illustrative approaches are described in commonly owned U.S. Pat. Nos. 6,247,745 and 6,199,942; and U.S. Pat. No. 6,443,513, which issued on Sep. 3, 2002 to Glance.

It is known, for example, to deploy truncated plastic cones at rollover stiff points or on door panels for side impacts with the objective of providing better performance than energy absorbent foam. Also, such cones may be less expensive to manufacture. Manufacturing economics have been realized from the raw materials being melt recyclable. Such structures not only provide weight savings and a better performance, but also a cost advantage which may amount to $4-$5 per vehicle.

The required energy absorption characteristics are defined in Federal Motor Vehicle Standards 201. To meet the relevant standards, the industry continues its quest not only for the physical structures that conform to federally mandated standards, but also to develop computer modeling protocols that predict head injury sustained from impacting forces and comparing the results with head injury criteria. It would be desirable in such developments to measure actual head impact (of, for example, a dummy occupant) during in-vehicle testing at selected locations in the vehicle. Ideally, the actual measurements will approximate the values predicted by computer dynamic finite element analysis.

Additionally, the desire to reduce costs while complying with End of Life Vehicle (ELV) legislation in Europe stimulates the use of mono-materials in automotive interior soft trim applications. Related considerations emphasize recyclability of automotive plastics. The impact or influence of the ELV directive on automotive interiors will be felt in various ways: e.g., cost effective use of recycling techniques with environmentally benign consequences. Most interior modules today are made from a combination of skin/foam/substrate. Thus, the materials currently used may present challenges to the recycling task. Such challenges may be met by more use of energy absorbing modules that are made from mono-materials. Such materials might, for example, include polyolefins and melt recyclable polymers, since they show promise as being versatile alternatives to skin/foam/substrate.

It is expected that Europe will adopt the U.S. HIC(d) requirements. This will affect the choice and quantity of materials used for energy absorbers in headliners. Similar door trim panel requirements apply to the pelvis and torso (side impact applications). It is therefore anticipated that there will be an increase in the usage of energy absorbers that will be incorporated into the structure of modules such as door trim panel, instrument panel uppers, and headliners.

To meet cost reduction goals, there is an increasing desire to manufacture interior modules using a reduced number of manufacturing steps.

In light of these and related approaches, there remains the desire to absorb as much impact energy in as little crush distance as possible, with as little weight as possible, yet be capable of being designed and manufactured under favorable economic conditions.

SUMMARY OF THE INVENTION

One object of the present invention is to provide a more cost effective, efficient energy absorber that can be "tuned" to produce predefined energy absorption characteristics within spatial constraints that may be imposed by a particular application.

The invention includes a modular energy absorber with one or more energy absorbing modules that are provided with means for coordinating energy absorbing units therewithin. The coordinating means has a topography with a variable number (n) of apertures. The means for coordinating alternatively include a web, a tether, a hinge, a planar surface, and wings or combinations thereof that serve to position and support the energy absorbing units in relation to each other before, during and after relative motion between an incident object and the energy absorber. The relative motion causes impact between the energy absorbing units and the incident object so that forces resulting from the impact are at least partially absorbed.

The absorber also has energy absorbing units that have a crushable member with an upper extremity that defines an upper perimeter, a lower extremity that defines a lower perimeter, and an intermediate section extending therebetween. Either the upper or lower extremities can be presented to the impacting force.

The crushable member at least partially collapses during energy absorption to a crushed configuration which in part is determined by the provision of a number (m) of breaches that are defined in the crushable member before impact. The breaches may be defined by slits (no material moved) or slots (material removed to form an opening).

To configure the modular energy absorber, the following steps are taken:

selecting one or more energy absorbing modules according to given spatial constraints and desired energy absorbing criteria;

providing a means for coordinating energy absorbing units with a pre-defined contoured topography;

locating one or more energy absorbing units in association with the means for coordinating energy absorbing units so that the one or more energy absorbing units are positioned in relation to each other before, during and after relative motion between an incident object and the energy absorber;

providing a wall within some of the one or more energy absorbing units so that the wall provides an upper perimeter, a lower perimeter, and an intermediate section extending therebetween;

defining a number (m) of breaches within the wall, (m) being an integer selected from the group consisting of (0, 1, 2, 3, . . . , 100); and providing a number (n) of apertures defined within the means for coordinating energy absorbing units, (n) being an integer selected from the group consisting of (0, 1, 2, 3, . . . , 100).

DETAILED DESCRIPTION OF THE PREFERRED EMBODIMENT(S)

Figure 1A:
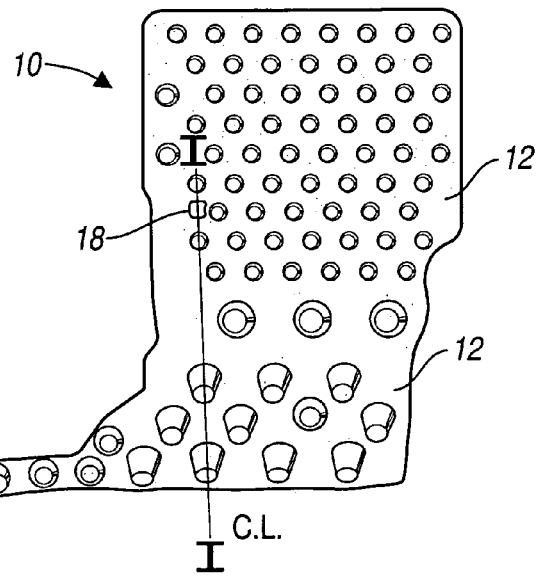
FIG. 1(a) is a top elevational view of a modular energy absorber constructed in accordance with the present invention, including two energy absorbing modules linked by a connection.
Figure 1B:
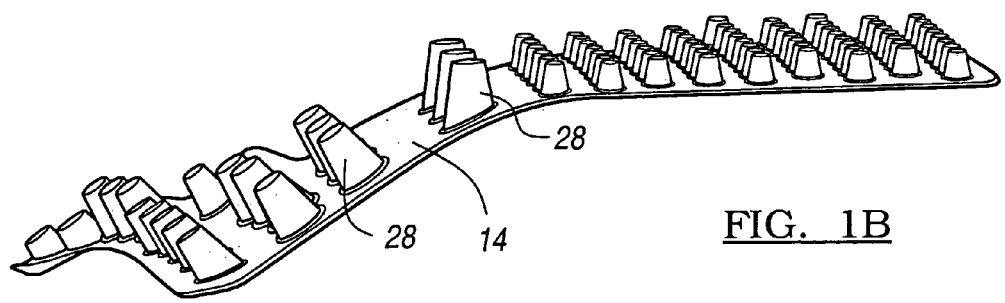
FIG. 1(b) is a quartering side elevational view thereof.
Figure 1C:
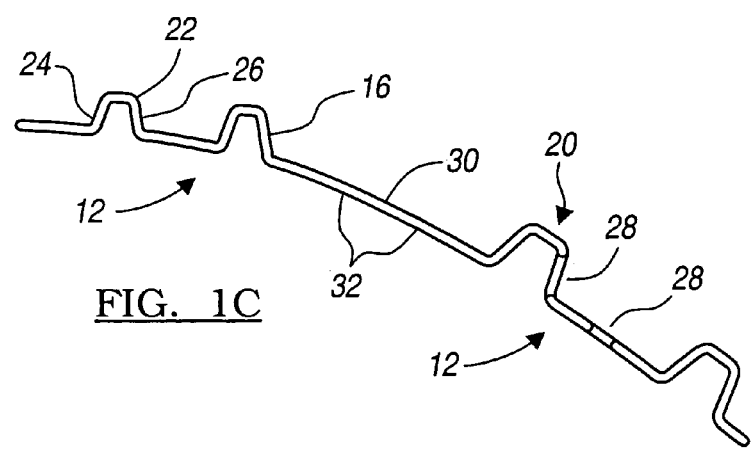
FIG. 1(c) is a cross-sectional view taken along the line I-I of FIG. 1(a)
Figure 2:
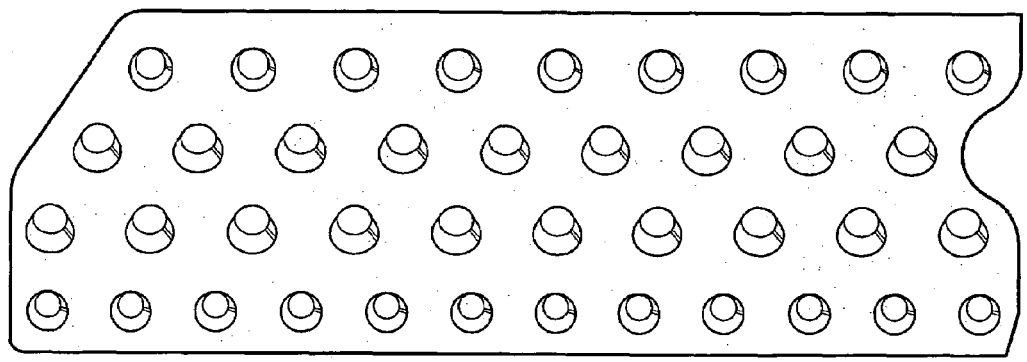
FIG. 2 is a top elevational view of an alternate embodiment of a modular energy absorber according to the present invention, in which there is one energy absorbing module with energy absorbing units that are positioned and supported by means for coordinating.
Figure 3A:
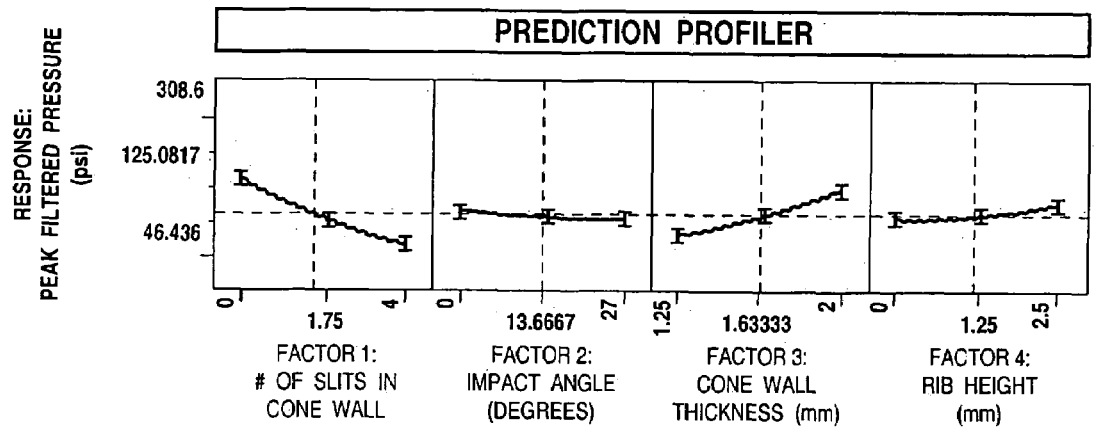
FIGS. 3(a)-(d) are graphs of four factors that influence energy absorbing characteristics (such as the number of slits, impact angle, wall thickness, and rib height plotted against peak filtered pressure (FIG. 3a); mean filtered pressure (FIG. 3b); standard deviation of filtered pressure (FIG. 3c); and cone mass (FIG. 3d)
Figure 3B:
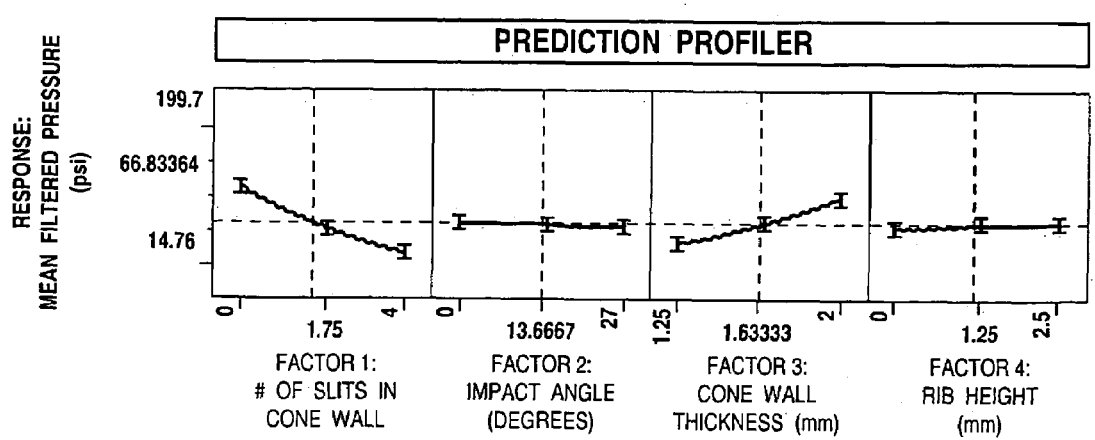
Figure 3C:
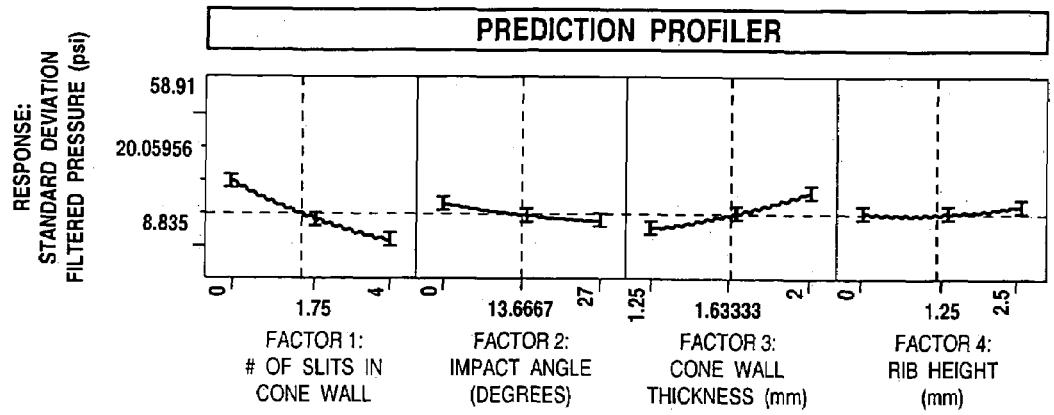
Figure 3D:
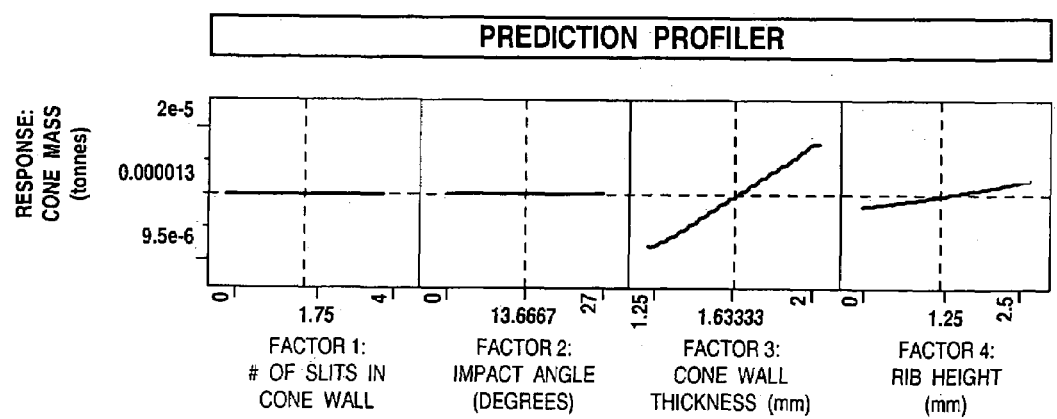

Turning first to FIGS. 1-2 of the drawings, there is depicted a modular energy absorber 10 that has one or more energy absorbing modules 12. Those modules include means 14 for coordinating energy absorbing units 16 of the energy absorbing modules. The means for coordinating 14 have a topography that includes a number (n) of apertures 18 defined therein.

The energy absorbing units coordinate with each other through the provision of coordinating means 14 that position and support the units in relation to each other before, during and after relative motion between an incident object (not shown) and the energy absorber 10. That relative motion causes impact between the energy absorbing units 16 and the incident object so that forces resulting therefrom are at least partially absorbed. In this way, the impact forces that are transmitted to an occupant of a vehicle within which, for example, the modular energy absorber 10 is situated are reduced, together with injuries sustained.

At least some of the energy absorbing unit 16 include a crushable member 20 that has an upper extremity or perimeter 22, a lower extremity or perimeter 24, and an intermediate section 26 extending therebetween.

Figure 8:
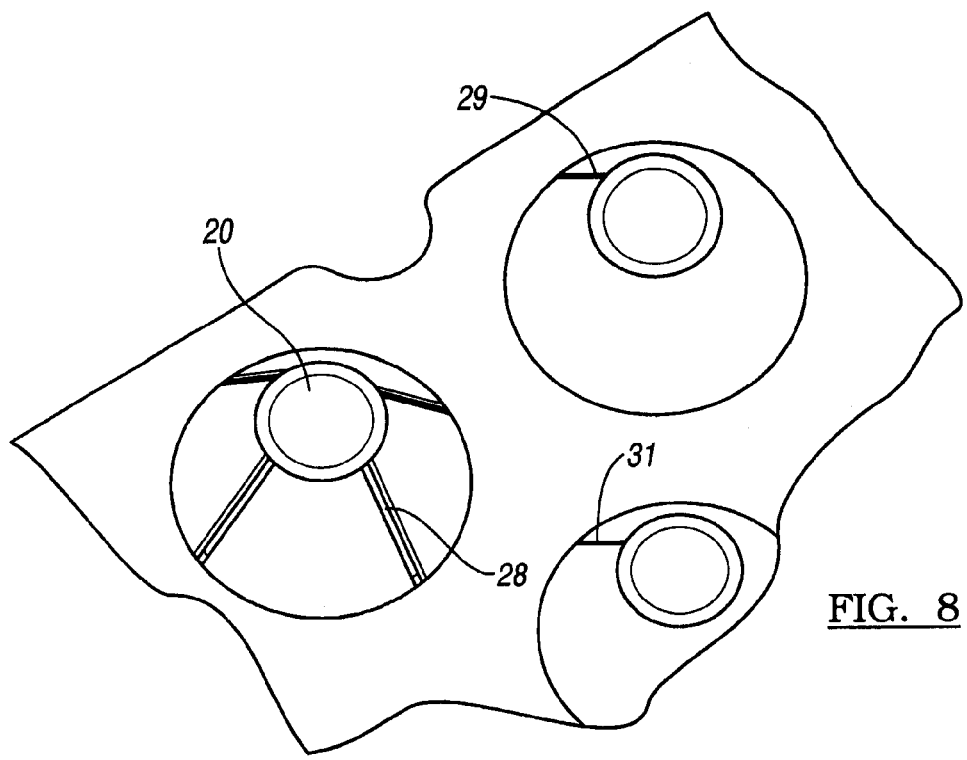
FIG. 8 is a quartering perspective view of a crushable member 20 having breaches 28 defined therein.
Figure 9:
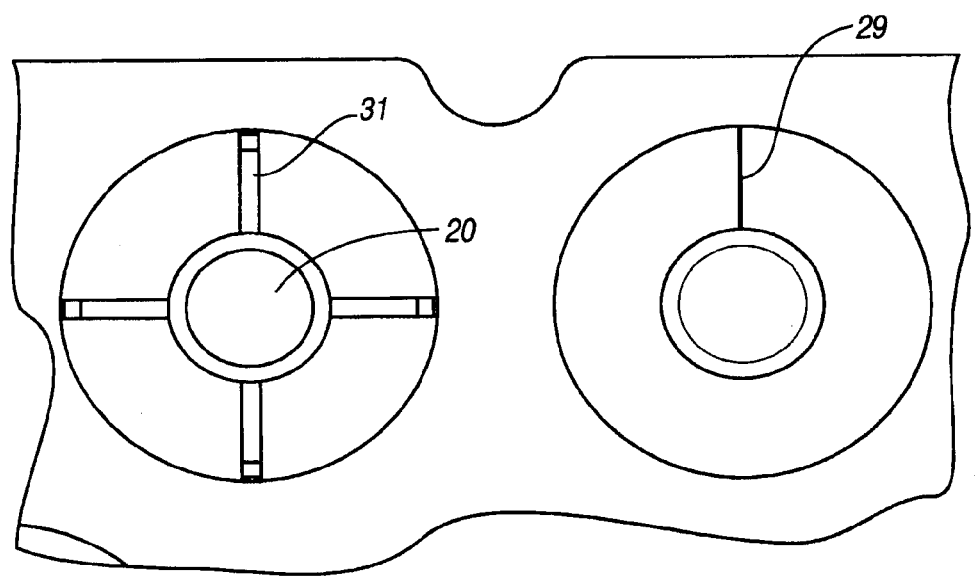
FIG. 9 is a top plan view of a pair of crushable members 20 that have slots and a slit defined within them.

Additionally, a number (m) of breaches 28 are defined within the crushable member 20 before impact. Preferably, the number of breaches is three where the breach is provided in the form of slots. As used in this disclosure, the term "slots" 31 (FIG. 9) implies an aperture with facing edges which lacks material or where material has been removed. As used herein, the term "slits" 29 (FIG. 8) implies a cut or gash that is formed without the removal of material. In the preferred embodiment, the three slots are inclined to an axis of symmetry of a given crushable member 20, but lie parallel to the draft angle, in the case where the crushable member is presented in the form of a cone.

As depicted in FIG. 1(b), the modular energy absorber includes, in the embodiment depicted, a hinge section 30 having leaves 32. Each leaf 32 extends from one of the one or more energy absorbing modules 12 so that they may be configured within the spatial constraints that are imposed by an environment within which the modular energy absorber 10 is positioned. The environment (not depicted) is selected from a group consisting of a headliner in a vehicle, a bumper assembly, a knee bolster, and a side impact location including a vehicle pillar and a door, a head rest or seat back.

In one embodiment, the modular energy absorber 10 has means for coordinating 14 the energy absorbing units 16 that may take the form of a web, a tether, a hinge, a planar surface (as depicted), and rings, or a combination thereof. In some cases, no apertures are provided in the energy absorbing coordinating means.

Figure 6:
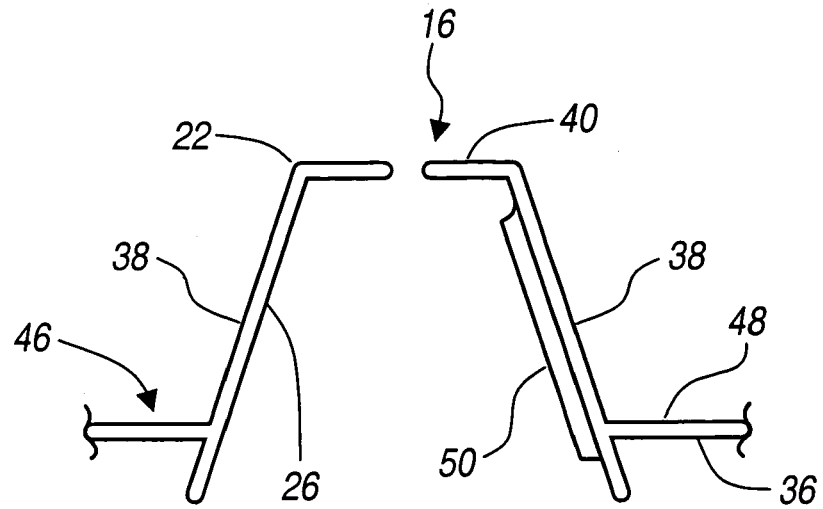
FIG. 6 is a side cross-sectional view of an energy absorbing unit that illustrates an intersection between means for coordinating energy absorbing units and the walls of a crushable member.

FIG. 6 depicts a floor 40 that extends at least partially between opposing faces of a wall 38. In one embodiment the floor is annular. Alternatively, the floor may extend from an intermediate section 26 of the wall 38. It should be appreciated, that in some embodiments, the floor may have a configuration that is non-planar. For example, where the floor 40 is provided proximate an upper extremity or perimeter 22 of an energy absorbing unit 16, the floor 40 may undulate or be otherwise configured in order to conform the modular energy absorber 10 to the spatial constraints imposed by the environment in which the absorber 10 is installed.

Figure 7:
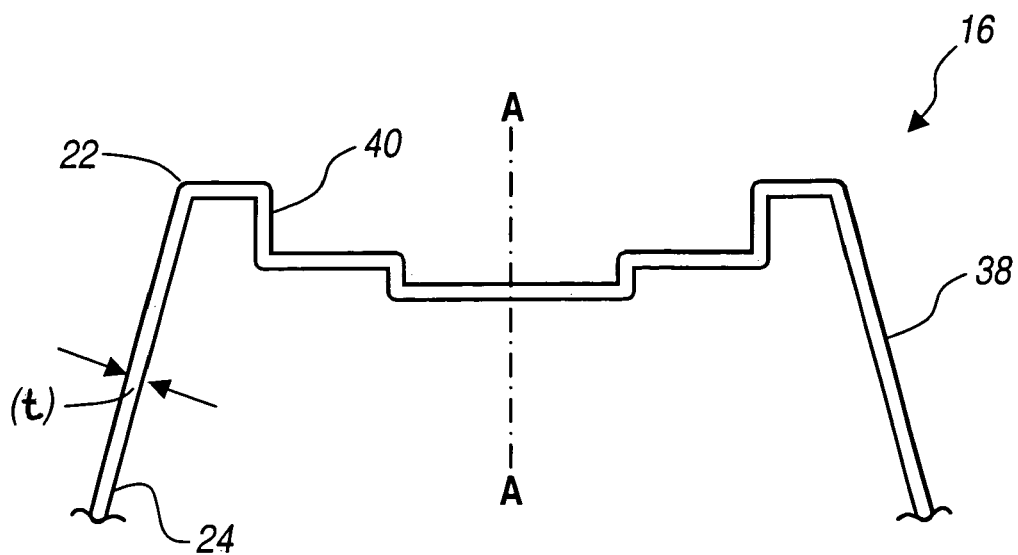
FIG. 7 illustrates an alternate embodiment of the invention wherein an energy absorbing unit is terminated by a floor that is shaped like an inverted wedding cake or, in a more rounded form, like a volcano with craters therein.

In FIG. 7, the floor is configured with a topography that is akin to a wedding cake with one or more layers. Alternatively, the floor 40 can be configured in a more rounded form as a volcano type of structure, including one or more craters defined therewithin. Continuing with reference to FIG. 7, some of the one or more energy absorbing units 16 have an imaginary axis of symmetry A-A to which the floor 40 may be inclined at an angle between zero and 180 degrees.

It will be appreciated that as a result of tuning the energy absorber (e.g. dimensional control of wall height, provision of slits or slots, wall thickness, and material selection), the configuration following impact is located in substantially the same position as the pre-impact configuration.

Continuing with primary reference to FIGS. 6-7, it will be appreciated that the wall 38 be characterized by a thickness (t) which may or may not be uniform between a top edge 22 and a lower edge 24 of the wall 38. In some configurations, where particular energy absorbing characteristics are desired or mandated, the wall 38 of a given energy absorbing unit 16 may have an average thickness ($t_1$) that differs from an average thickness ($t_2$) of a wall associated with another energy absorbing unit.

In some embodiments (FIG. 6 for example), means of coordinating 36 may be in the form of a rib or a channel 46, 48. While the means may be located at an intermediate section of a wall, it will be appreciated that it may also lie proximate its top or bottom edges.

Returning now to FIGS. 1-2, the designer may choose how best to locate energy absorbing units 16 within a given module. To facilitate an understanding of positional considerations, it is helpful to imagine that each energy absorbing unit 16 has an axis of symmetry which when projected may intersect an imaginary plane at a loci. An imaginary line can be drawn connecting adjacent loci in that plane. The energy absorbing unit 16 may be configured so that the line joining adjacent loci describes a geometrical figure. The figure may be a segmented line, a circle, an oval, an ellipse, a square, a diamond, a quadrilateral, and a polygon.

Figure 4A:
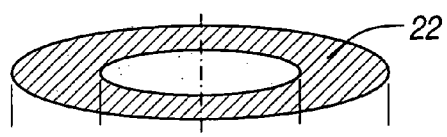
FIGS. 4(a-c) are schematic illustrations of a crushable member (pre-impact) that forms one of the energy absorbing units, enlarged to facilitate an understanding of several of its characteristics.
Figure 4B:
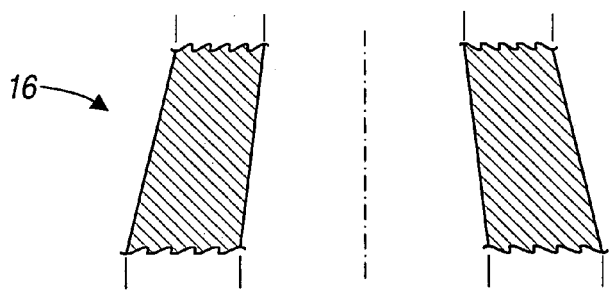
Figure 4C:
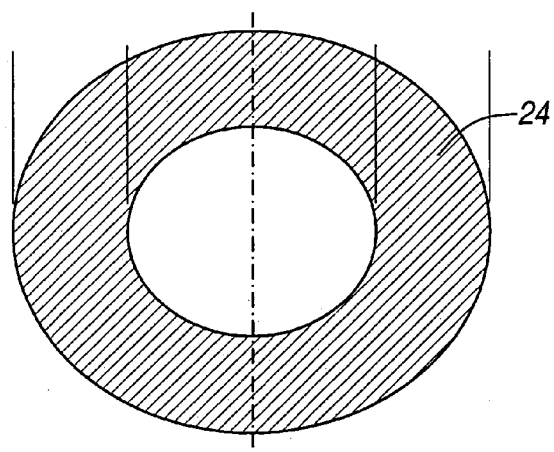

With reference to FIGS. 4(*a-c*), the lower perimeter 24 of a given energy absorbing unit 16 may describe a circle, an oval, or an ellipse. Similarly for the upper perimeter and intermediate section.

Figure 5:
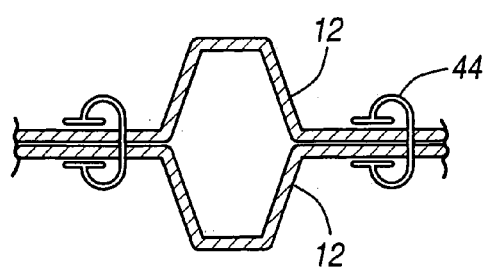
FIG. 5 is a cross-sectional view of a stacked configuration of energy absorbing units, including means for cooperating the impact resistance characteristics of the energy absorbers.

In FIG. 5, cooperating means 44 are provided in order to coordinate the deformation and energy absorbing characteristics of adjacent energy absorbing modules 12. It will be appreciated that the cooperating means may take the form of an adhesive, a clip, a vibration weld, a sonic weld, a heat stake, a "tongue in groove" arrangement, and the like. It will be appreciated that the stacked configuration depicted in FIG. 5 may be reoriented such that the energy units 12 may be nested in such a way that the peak of a given energy unit may lie in a valley (or floor) of the adjacent energy unit.

A method for configuring a modular energy absorber comprises the steps of:

selecting one or more energy absorbing modules according to given spatial constraints and desired energy absorbing criteria;

providing a means for coordinating energy absorbing units with a pre-defined contoured topography;

locating one or more energy absorbing units in association with the means for coordinating energy absorbing units so that the one or more energy absorbing units are positioned in relation to each other before, during and after relative motion between an incident object and the energy absorber;

providing a wall within some of the one or more energy absorbing units so that the wall provides an upper perimeter, a lower perimeter, and an intermediate section extending therebetween;

defining a number (m) of breaches within the wall, (m) being an integer selected from the group consisting of (0, 1, 2, 3, . . . , 100);

providing a number (n) of apertures defined within the means for coordinating energy absorbing units, (n) being an integer selected from the group consisting of (0, 1, 2, 3, . . . , 100);

quantifying the resulting modular energy absorbing characteristics of the absorbing structure;

comparing the characteristics with those desired; and reiterating as necessary.

The disclosed energy absorber can be manufactured at relatively low cost by thermoforming and impact performance can be optimized without expensive tooling modification at heights below about 50 millimeters. However, above this height, the base material thickness required to produce an energy absorber for the appropriate crush resistance is such that it cannot easily and inexpensively be produced using in-line thermoforming equipment. In such circumstances, injection molded absorbers can be produced perhaps at a lower cost.

Historically, optimizing crush resistance or the amount of energy absorbed by injection molded energy absorbers that are formed from rows of free standing or a lattice of ribs have been difficult and expensive to modify once the mold has been produced. Modifying rib thickness is usually accomplished by adding material to or removing material from the mold by burning, cutting, inserting and the like.

It is especially difficult to produce injection molded wall sections having a thickness less than about 1.25 millimeters. In such circumstances, multi-drop hot runner systems have been used to prevent the material from "freezing off" in the thin sections. Cuts or areas devoid of material have been used to weaken such ribs, but prove to be less efficient because they may create additional manufacturing issues. When ribs are integrated into the back side of class A surfaces (whose appearance is critical), changes in the ribs can "read through" and result in a product whose appearance is unacceptable.

It is therefore essential that an absorber's crush resistance be "tuned" or "dialed up or down" to provide the greatest measure of energy management or the highest level of occupant protection for a given set of impact conditions. Foam energy absorbers can be tuned by a change in density but have proven to be less efficient than those composed of metal, thermoplastic, or composite materials. Metal and composite absorbers are proven to be more expensive than their plastic counterparts, such as injection molded and thermoformed energy absorbers.

Preferably, the disclosed energy absorbers that include a structure with recesses in a base sheet produced by injection or compression molding. The recesses, for example, may have a minimum wall thickness of about 1.25 millimeters. Small tapered or drafted areas may have a thickness which is below this thickness.

The walls of the recesses may be thicker than 1.25 millimeters, but may have areas as thin as 1.25 millimeters to promote buckling of the recess at a given point.

Slits, or slots (areas devoid of material) may be provided which run mostly parallel to the walls of a given energy absorbing unit. Such breaches may or may not be present, but when present, the slots may or may not be of varying width. Ribs that protrude from the interior or exterior of a wall of an energy absorbing unit may or may not be present.

When present, the ribs 50 (FIG. 6) run mostly parallel to a wall of a recess, and may have convolutions which promotes the buckling of a recess at a given point. It will be appreciated that to produce given energy management characteristics, the ribs may vary in both height and width.

Turning now to FIGS. 3(*a-d*), there now follows a disclosure of a series of experiments that were conducted which involve finite element analysis modeling.

In order to tune the impact performance, a DOE was performed via FEA modeling. The results of that DOE are summarized in FIGS. 3(a-d).

The minimum wall thickness of 1.25 mm is such that it promotes material flow within the mold for injection molded designs with a minimal number of injection ports. Below this thickness, formed articles have more shear stress caused by forcing the polymer into a thin section. Thin sections are also difficult to fill. This involves higher injection molding pressures, larger equipment, higher utility costs and higher scrap rates. Areas thicker than 1.25 mm are less prone to these issues. By maintaining a minimum wall thickness of 1.25 mm, the cost to tool an absorber is minimized. Also, by increasing or decreasing the wall thickness, the crush resistance of the absorber can be tuned to optimize the impact performance.

The presence of breaches, such as slits, or slots (areas devoid of material) reduces the crush resistance of the recess. The number of slits (FIG. 1(c)) can also be changed to optimize impact performance to a lesser degree. Preferably, but not necessarily, the slits should run the entire length of the recess wall. By doing so, knit lines (areas where two melt fronts of plastic come together which have proven to be weak points in the formed article) are forced toward areas which are less involved in the energy management—such as the base or the roof of the recess.

The presence of ribs, which protrude from either side of the recess wall (FIG. 6), can be added or reduced in size to either increase or decrease the crush resistance of the structure. When present, ribs may also provide a channel that promotes material flow to areas adjacent to the rib. The rib height and width can be varied to increase or decrease crush resistance. In the preferred embodiment, the ribs are present on the interior of the recess.

Injection molds can be manufactured from a solid block of material or can be composed of a number of inserts. The preferred embodiment of each recess is a frusto-conical in shape. The advantage of this design is that it lends itself to both a simple and inexpensive means of optimizing impact performance through the use of inserts for the cone interior. These inserts are typically produced inexpensively on a numerically controlled lathe, rather than by more expensive methods such as NC machining and EDM techniques. The wall thickness of the recess can be easily changed by either modifying or simply replacing the original insert with one whose profile is different. By changing the wall thickness, the crush resistance can also be changed as detailed in FIGS. 3(a-d).

In summary, the crush resistance of each recess can be varied in order to optimize the impact performance with a minimal impact on tooling cost. It also lends itself to high manufacturing rates and low costs versus current competitive products, while still providing excellent impact performance.

The purpose of the experiments (see, the data depicted in FIGS. 3(a-d)) was to predict the resistance performance of a given absorber design, (e.g. made from polypropylene: Basell Pro-fax SV 152) and efficiently tune or optimize its geometry to match known benchmarks (up to 80 psi) of given countermeasures for automotive side impact.

Among the conclusions were these observations:
Performance is most sensitive to number of slits and wall thickness
Cone spacing could have been a factor in study as pressure on one cone depends on this
Once a design is tuned to perform as desired—it may be advantageous (material usage, uniformity) to determine an equivalent design by re-spacing cones within reasonable limits and eliminate slits
Can recalculate pressures for different cone spacing with raw data if desired
Design approach ultimately depends on whether countermeasure interacts with occupant and thus necessity for load transfer or energy management
Because impact velocity is constant, mean pressure directly correlates with energy absorbed.

Here is a summary of the results:

| #of Slits | Impact Angle (degrees) | Wall Thickness (mm) | Rib Height (mm) | Peak Pressure (PSI) | Mean Pressure (PSI) | Std. Dev. Pressure (PSI) | Cone Mass (tonnes) |
|---|---|---|---|---|---|---|---|
| 0 | 0 | 1.25 | 0 | 141.57 | 86.79 | 29.53 | 0.0081 |
| 2 | 27 | 1.65 | 1.25 | 115.42 | 61.08 | 16.63 | 0.0118 |
| 2 | 0 | 1.25 | 0 | 54.01 | 20.74 | 12.20 | 0.0081 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A modular energy absorber comprising:
one or more energy absorbing modules, one or more of which have:
means for coordinating energy absorbing units of the one or more modules, the means for coordinating having a pre-defined, contoured topography including a number (n) of apertures defined in a central region of the means for coordinating, where n≧1; and
one or more energy absorbing units associated with the means for coordinating, the means for coordinating positioning and supporting the one or more units in relation to each other before, during and after relative motion between an incident object and the energy absorber, so that impact forces resulting therefrom are at least partially absorbed, the apertures being defined between at least some of the energy absorbing units, at least some of the units including
a crushable member, with a number (m) of breaches defined therein before impact for tunability, where m≧1 and an upper extremity that defines an upper perimeter, a lower extremity that defines a lower perimeter and a wall including an intermediate section extending therebetween, the breaches being defined in a central region of the intermediate section, the crushable member at least partially collapsing during absorption to a crushed configuration.

2. The modular energy absorber assembly of claim 1 further comprising:
a hinge section having leaves, the hinge section providing a localized region of engineered weakness between at least some of the energy absorbing units of energy absorbing modules that allows the means for coordinating to be bent where desired and thus conform with spatial constraints imposed by an environment in which the absorber is positioned, each leaf extending from one of the one or more energy absorbing modules so that they may be configured within spatial constraints imposed by the environment within which the modular energy absorber is positioned, the environment being selected from the group consisting of a headliner in a vehicle, a bumper assembly, a knee bolster, and a side-impact location including a vehicle pillar and a door.

3. The modular energy absorber of claim 1 wherein the number (n) of apertures equals one.

4. The modular energy absorber of claim 1 wherein the means for coordinating comprises a form selected from the group consisting of a hinge, a planar surface, a non-planar surface, and combinations thereof.

5. The modular energy absorber of claim 1 wherein some of the one or more energy absorbing units have an imaginary axis of symmetry.

6. The modular energy absorber of claim 1 wherein a released configuration following rebound is located in substantially the same position as a pre-impact undeflected configuration.

7. The modular energy absorber of claim 5 wherein each axis of symmetry defines positioning loci that intersect a given plane, and a line that joins adjacent loci in that plane describes a geometrical figure selected from the group consisting of a segmented line, a circle, an oval, an ellipse, a square, a diamond, a quadrilateral, and a polygon.

8. The modular energy absorber of claim 1, wherein a lower perimeter of a crushable member defines a geometric figure that is selected from the group consisting of a circle, an oval, a polygon, and an ellipse.

9. The modular energy absorber of claim 1, wherein an upper perimeter of a crushable member defines a geometric figure that is selected from the group consisting of a circle, an oval, a polygon, and an ellipse.

10. The modular energy absorber of claim 1, wherein an intermediate section of a crushable member defines a geometric figure that is selected from the group consisting of a circle, an oval, a polygon, and an ellipse.

11. The modular energy absorber of claim 1, wherein the number of breaches (m) in a crushable member equals one.

* * * * *